(12) United States Patent
Tiberghien et al.

(10) Patent No.: US 7,195,228 B2
(45) Date of Patent: Mar. 27, 2007

(54) FEMALE CONNECTION ELEMENT, QUICK CONNECTION AND FILLING INSTALLATION COMPRISING SUCH A FEMALE ELEMENT

(75) Inventors: Alain-Christophe Tiberghien, Sevrier (FR); Antoine Chambaud, Giez (FR)

(73) Assignee: Staubli Faverges, Faverges (FR)

( * ) Notice: Subject to any disclaimer, the term of this patent is extended or adjusted under 35 U.S.C. 154(b) by 120 days.

(21) Appl. No.: 11/037,189

(22) Filed: Jan. 19, 2005

(65) Prior Publication Data
US 2005/0161628 A1 Jul. 28, 2005

(30) Foreign Application Priority Data
Jan. 27, 2004 (FR) ................................ 04 00753

(51) Int. Cl.
*F16L 29/02* (2006.01)
(52) U.S. Cl. .................................................. 251/149.6
(58) Field of Classification Search ...... 251/149–149.6
See application file for complete search history.

(56) References Cited

U.S. PATENT DOCUMENTS

| 3,715,099 A | * | 2/1973 | Shendure | 251/149.1 |
|---|---|---|---|---|
| 4,613,112 A | * | 9/1986 | Phlipot et al. | 251/149.6 |
| 5,535,985 A | * | 7/1996 | Larbuisson | 251/149.6 |
| 5,547,166 A | * | 8/1996 | Engdahl | 251/149.6 |
| 5,577,706 A | * | 11/1996 | King | 251/149.6 |
| 5,806,832 A | * | 9/1998 | Larbuisson | 251/149.6 |
| 5,927,683 A | * | 7/1999 | Weh et al. | 251/149.6 |
| 5,967,491 A | | 10/1999 | Brady | |
| 6,691,978 B1 | * | 2/2004 | Bartos et al. | 251/149.6 |
| 6,767,002 B2 | * | 7/2004 | Kerger et al. | 251/149.6 |
| 2003/0085572 A1 | | 5/2003 | Froment | |

FOREIGN PATENT DOCUMENTS

| GB | 732186 | 6/1955 |
|---|---|---|
| GB | 1554660 | 10/1979 |

\* cited by examiner

*Primary Examiner*—John Bastianelli
(74) *Attorney, Agent, or Firm*—Dowell & Dowell, P.C.

(57) ABSTRACT

A female element of a quick connection provided with a closure valve, wherein the opening of the valve is controlled by a reaction force exerted by an O-ring disposed in an inner housing of a body of a male connection element adapted to be fitted in the female element. The reaction force results from the abutment of the valve on the O-ring when the male and female elements are coupled together. Upon the failure of the O-ring, the valve is not displaced so that the risks of leakages are eliminated.

20 Claims, 1 Drawing Sheet

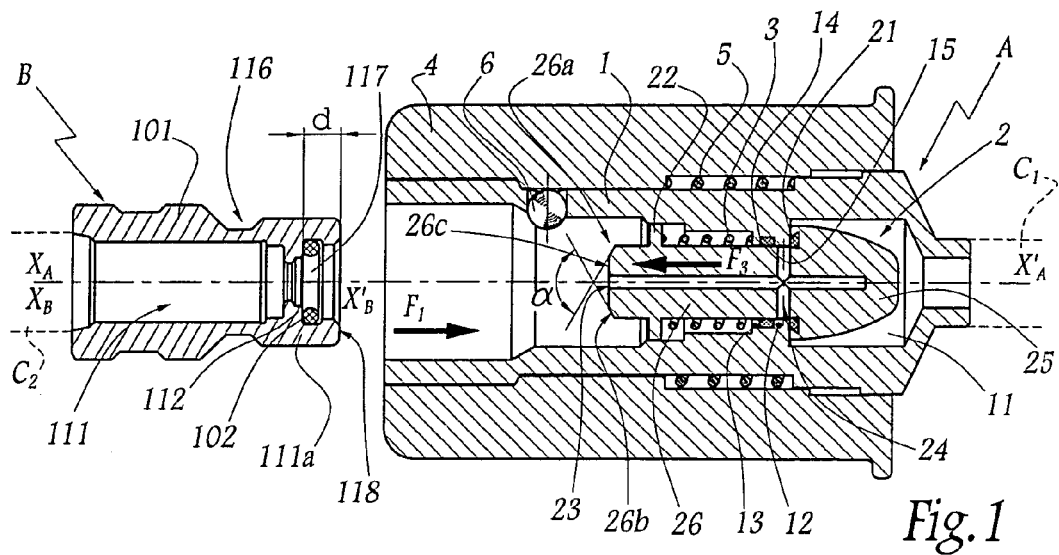
Fig.1
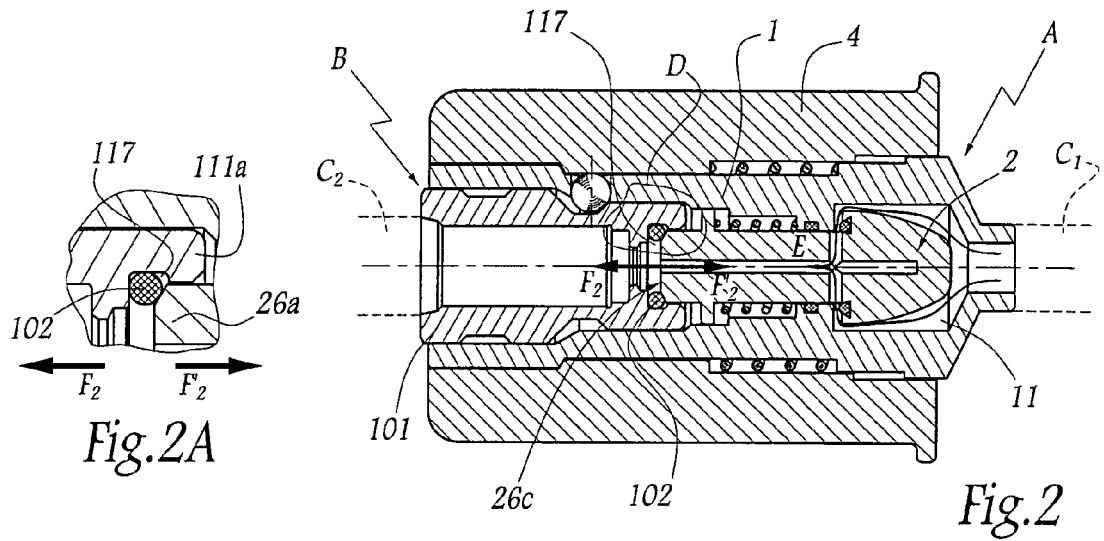
Fig.2A
Fig.2
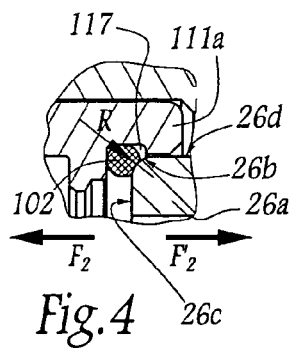
Fig.4
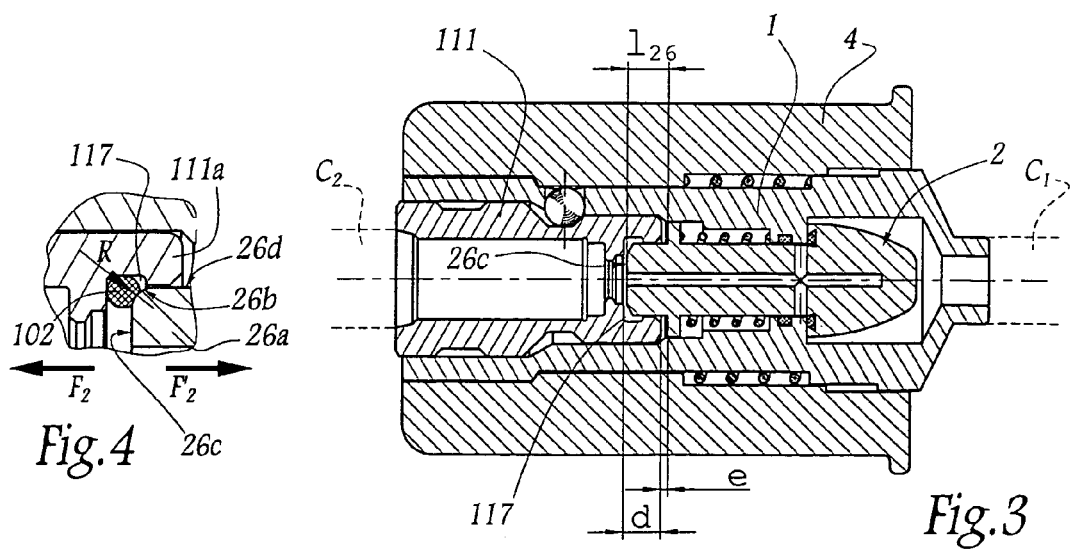
Fig.3

FEMALE CONNECTION ELEMENT, QUICK CONNECTION AND FILLING INSTALLATION COMPRISING SUCH A FEMALE ELEMENT

FIELD OF THE INVENTION

The present invention relates to a female element of a quick connection. It also relates to a quick connection for removably joining pipes conveying fluid under pressure, as well as to an installation for filling automobile vehicle tanks with gas under pressure, incorporating such a female element.

BACKGROUND OF THE INVENTION

In the domain of filling automobile vehicle tanks with gas under pressure, particularly liquefied petroleum gas (LPG), it is known that each automobile vehicle may be equipped with a male connector constituting the end of a pipe connected to a tank, this connector being intended to cooperate with a female element belonging to a filling installation, such as a service station. This male connector and this female element together form a quick connection intended to be manipulated by a consumer, such as the driver of an automobile vehicle.

Normally, the male connector of the automobile vehicle is equipped with an O-ring which ensures insulation between the channel for circulation of gas under pressure, formed by the coupled connection elements, and the ambient atmosphere. Now, it may happen that the O-ring, which should be present on the connector of an automobile vehicle, is absent due to wear and tear, cut, or further to an accidental ejection. The filling of a vehicle whose male connector is bereft of an O-ring is potentially dangerous, particularly due to the explosive nature of certain gases.

Similar problems are raised in other domains where an O-ring is used on a male connection element.

It is a more particular object of the present invention to overcome these drawbacks by eliminating, as far as possible, the risk of transit of fluid through the male and female elements of connections in the absence of an O-ring with which the male element must normally be equipped.

SUMMARY OF THE INVENTION

In that spirit, this invention relates to a female element of a quick connection provided with a closure valve, characterized in that the opening of this valve is controlled by an effort of reaction exerted by an O-ring disposed in an inner housing in the body of a male connection element adapted to be fitted in the female element, this effort resulting from the abutment of the valve on the O-ring further to the coupling of these male and female elements.

Thanks to the invention, the female element is opened, by displacement of its valve, only further to the interaction of the latter with the O-ring of a male element.

According to advantageous but non-obligatory aspects of the invention, a female connection element may incorporate one or more of the following characteristics:

The valve is provided with a part adapted to be engaged in the inner volume of the body of a male connection element and to come into abutment against the O-ring of this male element when the male and female elements are coupled.

Depending on the forms of embodiment under consideration, this part may be in one piece with or added on a principal part of the valve adapted to obturate an inner conduit of the female element.

In addition, the part adapted to be engaged in the inner volume of the body of a male element of the connection is advantageously provided with an outer peripheral bevel for abutment against an O-ring, this bevel being convergent in a direction opposite to a zone of tight abutment of the valve on the body of the female element.

The vertex angle of this bevel may present a value included between 60 and 175°, preferably between 80 and 160°, and preferably still, of the order of 120°.

In a variant embodiment, in place of the bevel, the afore-mentioned part may be shaped as a portion of torus.

This invention also relates to a quick connection for removably joining two pipes through which a fluid under pressure circulates, this connection comprising two elements, male and female, adapted to fit in each other axially, the male element being equipped with an O-ring disposed in a housing made in an inner surface of the body of this element, while the female element is as described hereinabove.

Advantageously, in the absence of the O-ring in the housing of the male element, the coupling of the male and female elements does not lead to the valve moving in the sense of opening.

Finally, this invention relates to an installation for filling automobile vehicle tanks with gas under pressure, each equipped with a male connection element provided with an O-ring disposed in a housing made on an inner surface of a body of this male element, this installation itself being equipped with a female connection element adapted to receive, fitted therein, one of the afore-mentioned male connection elements and provided with a closure valve. This installation is characterized in that the female element is as described hereinabove.

BRIEF DESCRIPTION OF THE DRAWINGS

The invention will be more readily understood and other advantages thereof will appear more clearly in the light of the following description of two forms of embodiment of a female element, of a connection, and of a part of an installation in accordance with its principle, given solely by way of example and made with reference to the accompanying drawings, in which:

FIG. 1 is an axial section through a male element and a female element of a connection according to the invention, in uncoupled configuration.

FIG. 2 is a section similar to FIG. 1, showing the connection in coupled configuration and when the male element is equipped with an O-ring.

FIG. 2A is a view on a larger scale of detail D in FIG. 2.

FIG. 3 is a section similar to FIG. 2 in the absence of the O-ring in the male element of the connection, and FIG. 4 is a view similar to FIG. 2A for a connection and an element in accordance with a second form of embodiment of the invention.

DESCRIPTION OF PREFERRED EMBODIMENTS

Referring now to the drawings, the connection shown in FIGS. 1 to 3 comprises a female element or connector A and a male element or connector B respectively connected to an upstream pipe $C_1$ and to a downstream pipe $C_2$. The upstream pipe $C_1$ is, itself, connected to a source of fluid under pressure (not shown).

In the present case, the element A belongs to an installation such as a service station and is connected via the pipe $C_1$, which is flexible, to a reservoir of liquefied petroleum gas. As for the connector B, it is mounted on an automobile vehicle and connected to the fuel tank of that vehicle. According to an aspect of the invention (not shown), the connector B may be equipped with an internal closure valve.

The body 1 of the female element A is of substantially cylindrical and circular shape, centred on an axis $X_A-X'_A$ which is also the longitudinal axis of a conduit 11 inside the body 1 and in which is disposed a valve 2 mobile along axis $X_A-X'_A$. The valve 2 is equipped with an O-ring 21 intended to come into abutment against an inner shoulder 12 of the body 1 in order to obturate the conduit 11. The valve 2 is provided with an outer radial flange 22 on which a spring 3 in abutment against a second shoulder 13 of the body 1 exerts an elastic effort $F_3$ of closure of the valve 2. The outer shape of the valve 2 is cylindrical, with circular base centred on axis $X_A-X'_A$. It is provided with an axial bore 23 and with a plurality of radial bores 24, of which two are visible in the Figures.

The valve 2 comprises a head 25 disposed in the conduit 11, upstream of the shoulder 12. It also comprises a rod 26 disposed downstream of the shoulder 12 and of which 26a denotes the end or "head" which projects with respect to the flange 22, opposite the head 25.

Between the shoulders 12 and 13, the body 2 is provided with a groove 14 for receiving an O-ring 15 against which the rod 26 bears.

A manoeuvring sleeve 4 is disposed around the body 1 and elastically loaded by a spring 5 towards a position where it exerts a centripetal effort on balls 6. Only one ball is visible in the Figures. In practice, the female element comprises a plurality of balls distributed about axis $X_A-X'_A$. In a variant, the balls may be replaced by fingers or pawls performing, like the balls 6, a function of locking the male connector in the coupled configuration shown in FIG. 2.

The outer shape of the body 101 of the male element B is substantially cylindrical and circular, centred on an axis $X_B-X'_B$ which is intended to merge with axis $X_A-X'_A$ when elements A and B are in coupled configuration. The body 101 defines a conduit 111 for circulation of gas under pressure and is provided with a groove 116 for receiving the balls 6 with a view to locking the elements A and B in coupled configuration.

The body 101 is also provided with an inner radial groove 117 which borders the end part 111a of the conduit 111 closest to its opening and in which an O-ring 102 is disposed. This O-ring 102 aims at ensuring an efficient insulation between the assembly constituted by conduits 11 and 111, on the one hand, and the ambient atmosphere, on the other hand, when elements A and B are coupled.

As the groove 117 is made inside the body 101, the O-ring 102 is relatively protected from the mechanical and chemical aggressions coming from the outside.

The groove 117 is adjacent an inner radial shoulder 112 of the body 101 and d denotes the distance between this shoulder 112 and the front face 118 of the body 101.

The head 26a of the rod 26 is provided with an outer peripheral bevel 26b of which the vertex angle α has a value of the order of 120°. In practice, the angle α may have a value included between 60 and 175°, preferably between 80 and 160°, and preferably still, of the order of 120°.

When the elements A and B are to be fitted in each other, they are subjected to a movement of approach represented by arrow $F_1$ in FIG. 1, this making it possible to attain the configuration of FIG. 2 where the head 26a has penetrated in the end 111a of the conduit 111. In this configuration, the bevel 26b bears against the O-ring 102 and exerts thereon an axial effort $F_2$. Due to its stiffness, which is greater than that of the spring 3, the O-ring 102 exerts on the bevel 26b an effort of reaction $F'_2$ which makes it possible to push the valve 2 against the effort $F_3$, the valve 2 in that case attaining the position of FIG. 2 where the channels 24 and 23 allow the flow of gas under pressure from the upstream part of the conduit 11 towards the conduit 111, as represented by arrows E.

The value of the angle α influences the deformation of the O-ring 102, its tightness and its durability. An angle α of the order of 120° gives satisfactory results and makes it possible to conciliate a clear-cut abutment of the head 26a on the O-ring 102, without degradation of the latter, with a clear-cut opening of the valve 2.

In the absence of O-ring 102 in the groove 117, and as shown in FIG. 3, the front face 26c of the end 26a does not bear against the shoulder 112, with the result that the valve 2 remains in position of tight abutment against the shoulder 12 which serves as seat therefor.

To that end, the length $l_{26}$ of the end 26a is less than the sum of the distance d and of the distance e between the front face 118 of the element B and the flange 22, when the valve is in closed configuration.

In view of the foregoing, a secured functioning of the connection formed by elements A and B is obtained, insofar as the valve 2 is efficiently displaced by the O-ring 102 when the elements A and B are coupled, while, in the absence of the O-ring 102, the valve remains in abutment on its seat 12, this avoiding the risks of leakage and allowing an efficient detection of the absence of O-ring.

The invention has been represented when used in a service station for filling automobile vehicle tanks, but may be employed in other domains where similar problems are likely to occur.

In the example shown, the head or end 26a is in one piece with the head 25 and the rod 26 of the valve 2. In a variant embodiment, this head may be added on this rod and fixed by any appropriate means, particularly by adhesion, screwing or welding.

The head 26a is not necessarily equipped with a bevel as shown in the Figures with reference 26b. In the case shown in FIG. 4, the zone of transition 26b between its front face 26c and its outer radial surface 26d is preferably rounded, with a radius of curvature R greater than 0.3 mm, avoiding the O-ring 102 being marked by the head 26a. The zone of transition 26b is in that case in the form of a portion of torus.

In addition, the diameter of the rod 26 in the vicinity of the channels 24, i.e. in the vicinity of the shoulder 12 and of the O-ring 15, is advantageously greater than the diameter of the head or end 26a. In this way, the resultant of the pressure of the gas in the coupled connection tends to close the valve 2. In practice, the diameter of the rod 26 may be slightly greater than that of the head 26a, for example 0.2 mm.

What is claimed is:

1. A female element of a quick connection, comprising: a closure valve, wherein opening of said valve is controlled by a reaction force exerted by an O-ring disposed in an inner housing of a body of a male connection element adapted to be fitted in said female element, said reaction force resulting from an abutment of said valve on said O-ring during a coupling of said male and female elements.

2. The connection element of claim 1, wherein said valve includes a part adapted to be engaged in an inner volume of the body of said male connection element and to come into abutment against said O-ring when said male and female elements are coupled.

3. The connection element of claim 2, wherein said part is integral with a principal part of said valve adapted to obturate an inner conduit of said female element.

4. The connection element of claim 2, wherein said part is added on a principal part of said valve adapted to obturate an inner conduit of said female element.

5. The connection of claim 2, wherein said part adapted to be engaged in the inner volume of the body of the male connection element has an outer peripheral bevel for abutment against said O-ring, said bevel being convergent in a direction opposite a zone of tight abutment of said valve on the body of said female element.

6. The connection element of claim 5, wherein said outer peripheral bevel has a vertex angle between 60 and 175°.

7. The connection element of claim 2, wherein said part has a transition zone between a front face and an outer radial surface of said part, said transition zone is substantially shaped as a portion of torus.

8. A quick connection for removably joining two pipes through which a fluid under pressure circulates, said connection comprising:
a male element including an O-ring disposed in a housing made in an inner surface of a body of said male element; and
a female element adapted to receive the male element, said female element including a closure valve, wherein opening of said valve is controlled by a reaction force exerted by said O-ring disposed in an inner housing of the body of said male element, said reaction force resulting from an abutment of said valve on said O-ring during a coupling of said male and female elements.

9. The connection of claim 8, wherein, upon a failure of said O-ring in said housing, the coupling of said male and female elements does not open said valve.

10. An installation for filling automobile vehicle tanks with gas under pressure, each tank equipped with a male connection element provided with an O-ring disposed in a housing made on an inner surface of a body of said male element, said installation comprising a female connection element adapted to receive, fitted therein, one of the male connection elements, said female connection element including a closure valve, wherein opening of said valve is controlled by a reaction force exerted by the O-ring disposed in an inner housing of the body of the male connection element, said reaction force resulting from an abutment of said valve on the O-ring during a coupling of said male and female connection elements.

11. The connection element of claim 5, wherein said outer peripheral bevel has a vertex angle between 80 and 160°.

12. The connection element of claim 5, wherein said outer peripheral bevel has a vertex angle of approximately 120°.

13. The connection of claim 8, wherein said valve includes a part adapted to be engaged in an inner volume of the body of said male connection element and to come into abutment against said O-ring when said male and female elements are coupled.

14. The connection element of claim 13, wherein said part is integral with a principal part of said valve adapted to obturate an inner conduit of said female element.

15. The connection element of claim 13, wherein said part is added on a principal part of said valve adapted to obturate an inner conduit of said female element.

16. The connection of claim 13, wherein said part adapted to be engaged in the inner volume of the body of said male connection element has an outer peripheral bevel for abutment against said O-ring, said bevel being convergent in a direction opposite a zone of tight abutment of said valve on the body of said female element.

17. The connection element of claim 16, wherein said outer peripheral bevel has a vertex angle between 60 and 175°.

18. The connection element of claim 16, wherein said outer peripheral bevel has a vertex angle between 80 and 160°.

19. The connection element of claim 16, wherein said outer peripheral bevel has a vertex angle of approximately 120°.

20. The connection element of claim 13, wherein said part has a transition zone between a front face and an outer radial surface of said part, said transition zone is substantially shaped as a portion of torus.

* * * * *